(12) United States Patent
Miller (10) Patent No.: US 12,313,964 B1
(45) Date of Patent: May 27, 2025

(54) HOME PLANETARIUM PROJECTION SYSTEM WITH OPTICAL ZOOM LENS

(71) Applicant: Miller Engineering, LLC, Stamford, CT (US)

(72) Inventor: Christopher Miller, Stamford, CT (US)

(73) Assignee: Miller Engineering, LLC, Stamford, CT (US)

(*) Notice: Subject to any disclaimer, the term of this patent is extended or adjusted under 35 U.S.C. 154(b) by 0 days.

(21) Appl. No.: 18/434,953

(22) Filed: Feb. 7, 2024

(51) Int. Cl.
| | |
|---|---|
| G03B 21/14 | (2006.01) |
| G02B 7/10 | (2021.01) |
| G09B 27/04 | (2006.01) |
| F21S 10/00 | (2006.01) |
| F21Y 115/10 | (2016.01) |

(52) U.S. Cl.
CPC ............ G03B 21/142 (2013.01); G02B 7/10 (2013.01); G09B 27/04 (2013.01); *F21S 10/007* (2013.01); *F21Y 2115/10* (2016.08)

(58) Field of Classification Search
CPC ............... G02B 26/10; G02B 23/2438; G02B 23/2476; G02B 23/2484; G02B 7/04; G02B 7/08; G02B 7/28; G03B 37/04; A61B 1/00126; A61B 1/00128; A61B 1/00188; A61B 1/042
See application file for complete search history.

(56) References Cited

U.S. PATENT DOCUMENTS

| | | | |
|---|---|---|---|
| 8,684,745 B2 | 4/2014 | Chen et al. | |
| 11,686,950 B2 * | 6/2023 | Liu | G02B 27/4205 |
| | | | 353/28 |
| 2012/0008103 A1 * | 1/2012 | Lalley | G03B 37/06 |
| | | | 353/121 |
| 2019/0037184 A1 | 1/2019 | Gauba | |
| 2022/0074738 A1 * | 3/2022 | Pollard | G01B 11/2527 |

FOREIGN PATENT DOCUMENTS

| | | | | |
|---|---|---|---|---|
| CN | 104833481 | * | 8/2015 | |
| DE | 202008005376 | * | 9/2009 | ......... G03B 21/2033 |
| DK | 202008005376 | * | 9/2009 | ............. G03B 21/20 |
| JP | 61141434 | | 6/1986 | |
| JP | H078814 | * | 2/1995 | |
| JP | 2008076642 | * | 4/2008 | ............. G03B 21/00 |

(Continued)

OTHER PUBLICATIONS

XGMI Tech; Digital vs. Optical Zoom for Projectors; [retrieved on Mar. 11, 2024] <URL: https://global.xgimi.com/blogs/projectors-101/digital-vs-optical-zoom-for-projectors>; Dec. 2023; 8 pages.

(Continued)

*Primary Examiner* — Brandi N Thomas
(74) *Attorney, Agent, or Firm* — Lipsitz & McAllister, LLC (57) ABSTRACT

A personal planetarium projection system is provided. The system may comprise a light source, a removable star disc comprising a transparent star and planet pattern, and a focus lens mechanism for focusing the light source through the star disc. The system may also comprise an optical zoom lens for projecting light passing through the star disc onto a projection surface to produce a projected image. The zoom lens enables different magnifications of the projected image.

13 Claims, 6 Drawing Sheets

(56) References Cited

FOREIGN PATENT DOCUMENTS

| JP | WO2009107553 | | 9/2009 | |
|---|---|---|---|---|
| JP | 2016186559 | * | 10/2016 | |
| WO | WO 2010023868 | * | 3/2010 | |
| WO | WO 2020/209855 | * | 10/2020 | ......... G01B 11/2545 |

OTHER PUBLICATIONS

Protech Projection Systems, Inc.; Panasonic ET-D3QS400 Zoom Lens for the PT-RQ50K Projector; [retrieved on Mar. 11, 2024] <URL: https://protechprojection.com/panasonic-et-d3qs400-zoom-lens-for-the-pt-rq50k-projector/>; 3 pages; [admitted prior art].

Iglobe, Inc.; iGlobe 3D; [retrieved on Mar. 11, 2024] <URL: https://www.iglobeinc.com/iglobe-3d>; 2 pages; [admitted prior art].

Iglobe, Inc.; HyperDome; [retrieved on Mar. 11, 2024] <URL: https://www.iglobeinc.com/copy-of-iglobe-3d>; 1 page; [admitted prior art].

\* cited by examiner

HOME PLANETARIUM PROJECTION SYSTEM WITH OPTICAL ZOOM LENS

BACKGROUND OF THE INVENTION

The present invention relates to the field of planetariums. More specifically, the present invention relates to a home planetarium projection system which employs an optical zoom lens. Personal planetariums project celestial patterns on a screen, ceiling or other display surface. Simple prior art planetariums create a celestial pattern by projecting light through a film or a disc with the celestial patterns arranged thereon. Such prior art planetariums use fixed focal length lenses. More advanced planetariums are all digital, using a digital database of celestial maps which can be projected onto a display. Such digital systems are able to zoom in and zoom out using software.

However, there are no non-digital planetarium projection systems that employ an optical zoom lens.

It would be advantageous to provide zoom lens capability in a home planetarium projection system without the complexity of a digital system. It would also be advantageous to provide a robust analog-based planetarium system with zoom lens capability.

The methods and apparatus of the present invention provide the foregoing and other advantages.

SUMMARY OF THE INVENTION

The present invention relates to a home planetarium projection system which employs an optical zoom lens.

In one example embodiment in accordance with the present invention, a personal planetarium projection system is provided. The system may comprise a light source, a removable star disc comprising a transparent star and planet pattern, and a focus lens mechanism for focusing the light source through the star disc. The system may also comprise an optical zoom lens for projecting light passing through the star disc onto a projection surface to produce a projected image. The zoom lens enables different magnifications of the projected image.

The light source may comprise an LED light source.

The optical zoom lens may comprise a movable focus ring for adjusting the focus of the projected image and a movable zoom ring for adjusting the magnification of the projected image.

The removable star disc may comprise a glass disc with a chrome layer etched with the star and planet pattern. Multiple removable star discs may be provided, each of the multiple removable star discs may comprise a different star and planet pattern. For example, each star disc may display a different area of the night sky.

The focus lens mechanism may comprise a lower condenser lens and an upper condenser lens.

The planetarium projection system may also comprise a drive motor for driving a reduction gear set for rotating the star disc.

The planetarium projection system may also comprise a star disc tray for holding the star disc and a star disc cover for securing the star disc in the star disc tray.

In a further example embodiment, the planetarium projection system may also comprise a housing and a two-part ball-shaped cover movably mounted for angular rotation in the housing, the two-part ball-shaped cover comprising an upper ball cover part and a lower ball cover part. The zoom lens may be mounted in the upper ball cover part.

The zoom lens may comprise a varifocal zoom lens. The zoom lens may comprise a 2.8-12 mm CCTV lens. The zoom lens may have a zoom ratio of approximately 4.3. Those skilled in the art will appreciate that zoom lenses having different focal lengths and magnifications may be used.

The present invention also encompasses a method for projecting a star and planet pattern onto a projection surface. In an example embodiment, such a method may comprise focusing light from a light source through a star disc comprising a transparent star and planet pattern and providing an optical zoom lens for projecting light passing through the star disc onto a projection surface to produce a projected image. The zoom lens may enable different magnifications of the projected image.

The method may also include aspects of the personal planetarium projection system discussed above.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
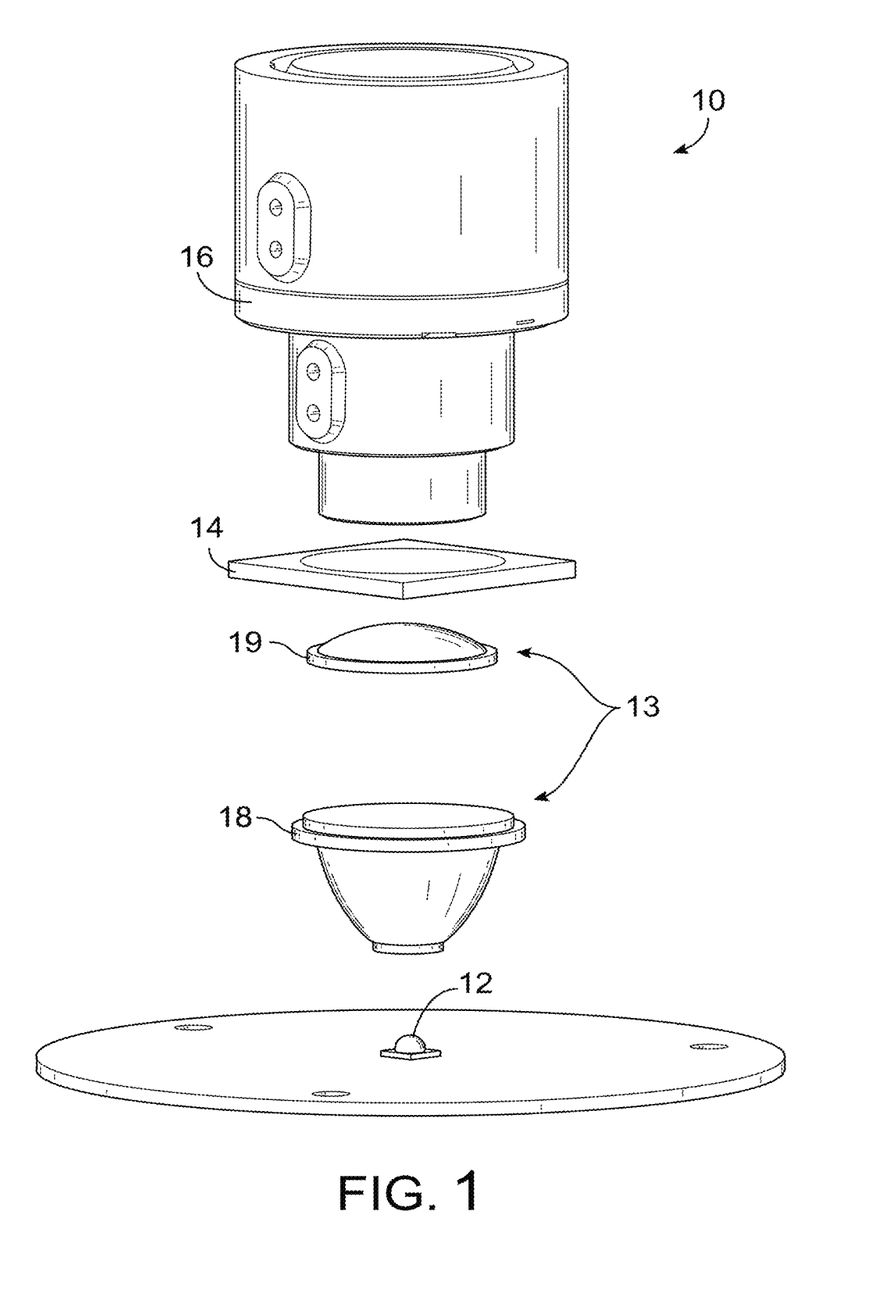
FIG. 1 shows a simplified exploded view of an example embodiment of a planetarium projection system in accordance with the present invention.

FIG. 1 shows a simplified exploded view of an example embodiment of a personal planetarium projection system 10 in accordance with the present invention. The system 10 may comprise a light source 12, a removable star disc 14 comprising a transparent star and planet pattern, and a focus lens mechanism 13 for focusing the light source through the star disc 14. The system 10 may also comprise an optical zoom lens 16 for projecting light passing through the star disc 14 onto a projection surface to produce a projected image (e.g., of the night sky or a part of the night sky). The zoom lens 16 enables different magnifications of the projected image.

The projection surface may comprise a ceiling, a wall, a projection screen, or the like. The projection surface may also comprise the inside of a curved roof of an inflatable dome, providing an immersive user experience. The dome may be provided in different sizes that can be placed inside a room of the user's home. For example, the dome may be sized to accommodate 1, 2, 3 or more people. The dome may be inflated utilizing a hand or foot pump, a small electric pump, or compressor.

The light source 12 may comprise an LED light source. Those skilled in the art will appreciate that other lights sources may be used.

Figure 2:
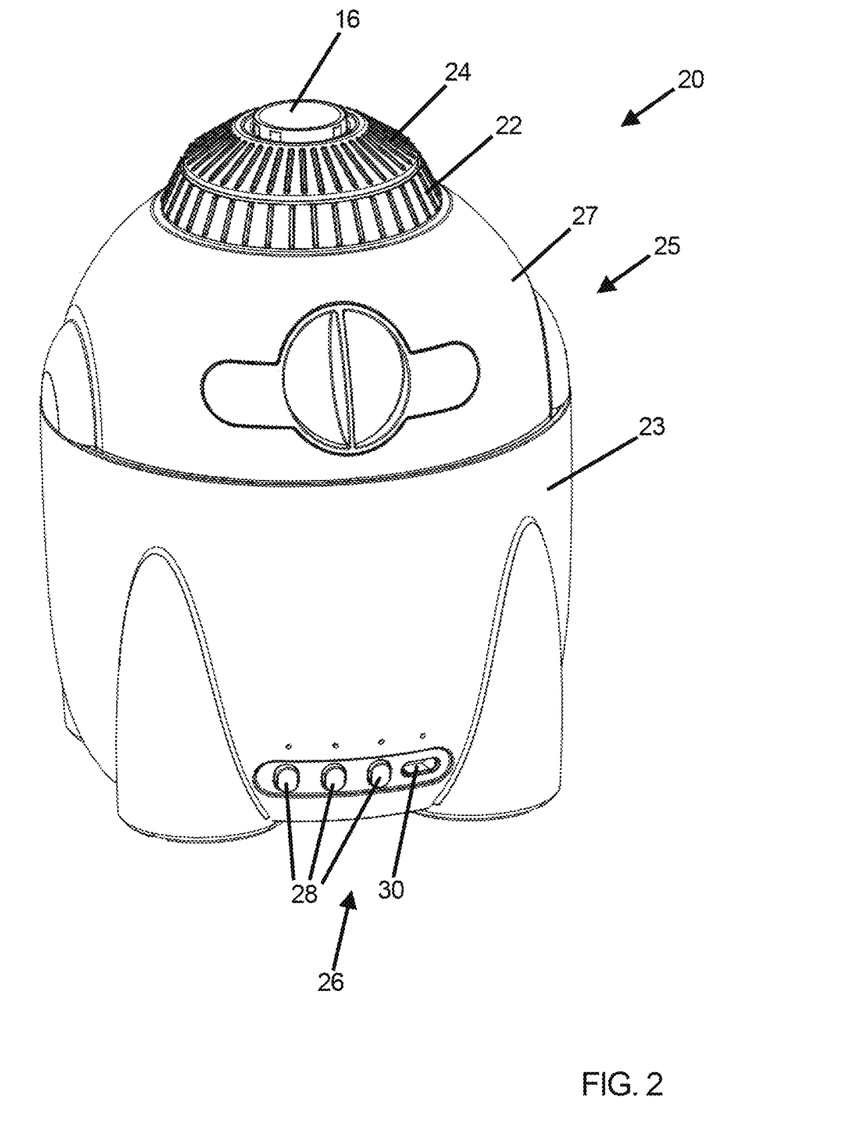
FIGS. 2 and 3 show an example embodiment of a planetarium projector in accordance with the present invention in different angular positions, respectively.
Figure 3:
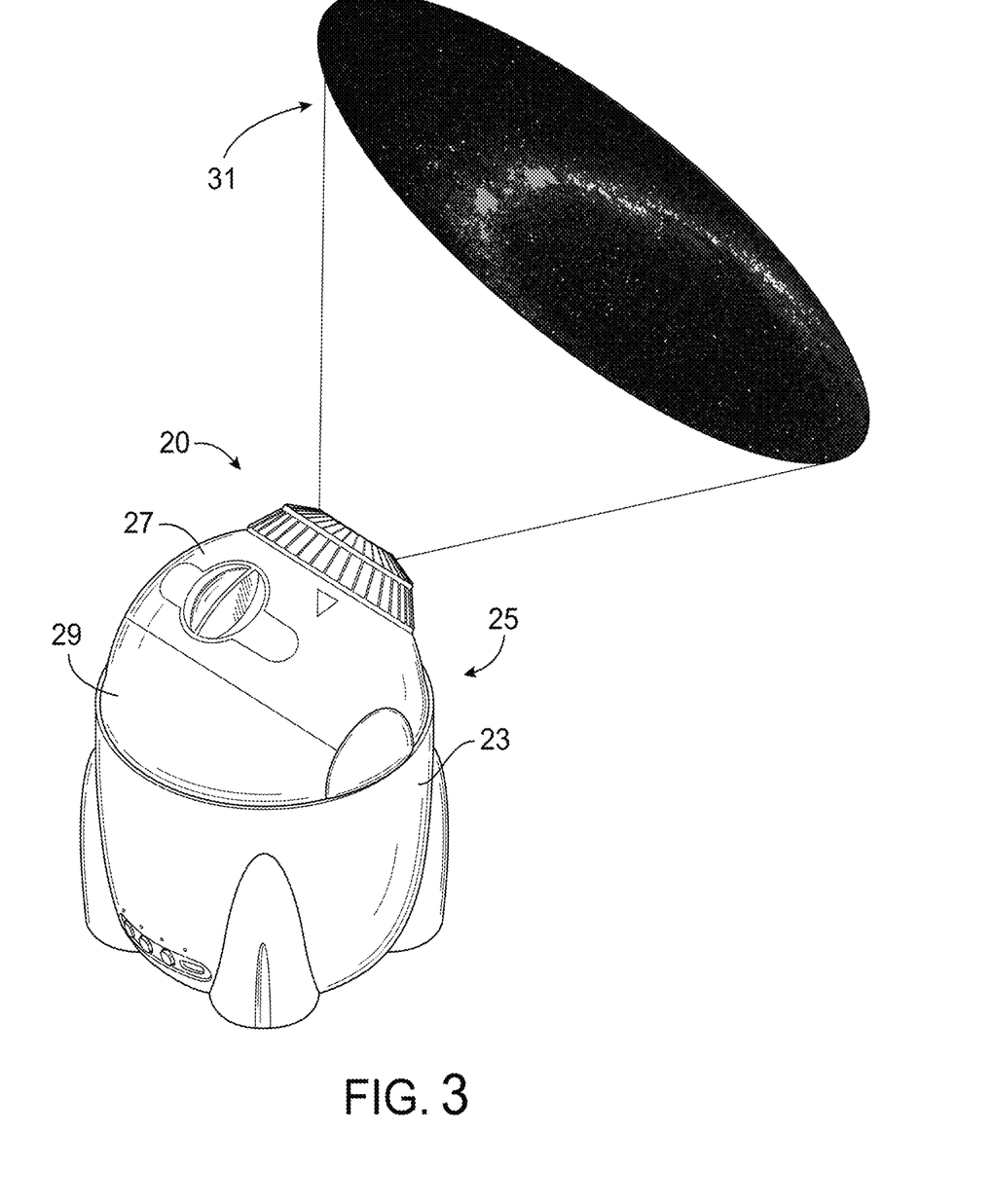

The projection system 10 may be in the form of a projector. FIGS. 2 and 3 show an example embodiment of a planetarium projector 20 in accordance with the present invention. As shown in FIG. 2, the optical zoom lens 16 may comprise a movable focus ring 22 for adjusting the focus of the projected image and a movable zoom ring 24 for adjusting the projection angle and magnification of the projected image. The planetarium projector 20 may also comprise a housing 23 and a two-part ball-shaped cover 25 movably mounted for angular rotation in the housing 23, the two-part ball-shaped cover 25 comprising an upper ball cover part 27 and a lower ball cover part 29 as shown in FIG. 3. The zoom lens 16 may be mounted in the upper ball cover part 27. The two-part ball shaped cover 25 may be rotated in the housing 23 to aim the zoom lens 16 so that the projected image 31 is displayed at a desired location. As an example, FIG. 3 shows the projector 20 with the ball shaped cover 25 rotated (as compared to the FIG. 2 position) and projecting a projected image 31.

Figure 4:
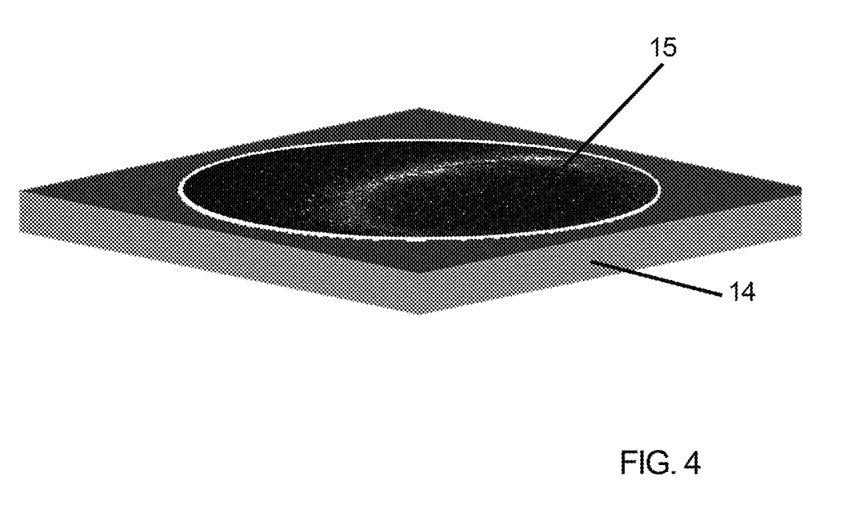
FIG. 4 shows an example embodiment of a star disc with a star and planet pattern in accordance with the present invention.

FIG. 4 shows an example embodiment of a star disc 14 with a star and planet pattern 15. The removable star disc 14 may comprise a glass disc with a chrome layer etched with the star and planet pattern 15. Multiple removable star discs 14 may be provided, each of the multiple removable star discs 14 may comprise a different star and planet pattern 15. For example, each star disc 14 may display a different area of the night sky.

Figure 5:
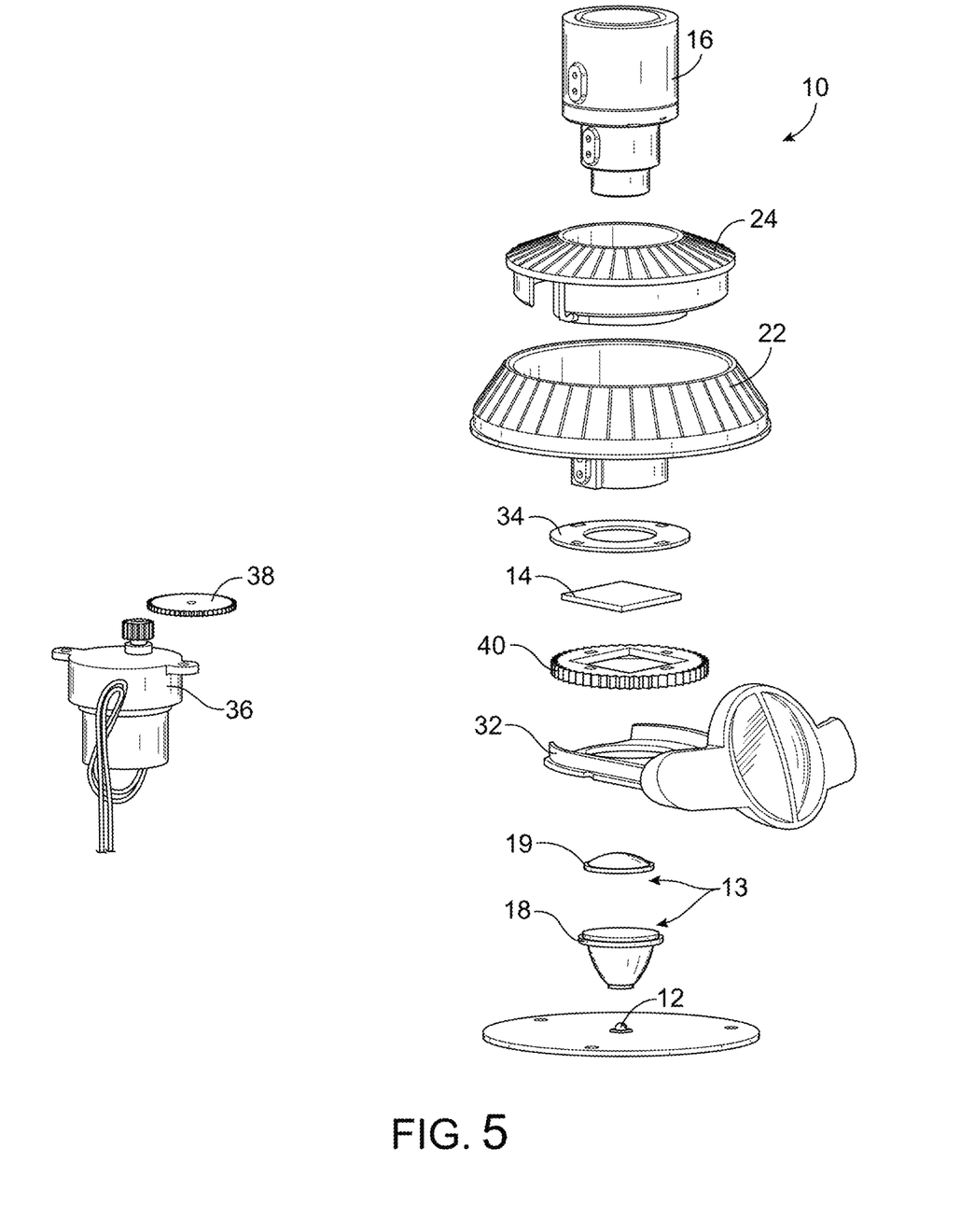
FIG. 5 shows a detailed exploded view of an example embodiment of a planetarium system in accordance with the present invention.

FIG. 5 shows a more detailed exploded view of a planetarium projection system 10 in accordance with the present invention. As shown in FIG. 5, the planetarium projection system 10 may also comprise a star disc tray 32 for holding a star disc assembly (comprised of the star disc 14, star disc cover 34 and final reduction gear 40). The star disc 14 can be changed by removing the tray 32, inserting a new star disc 14 into the star disc assembly, replacing the assembly into the tray 32, and inserting the tray 32 back into the projector 20.

The planetarium projection system 10 may also comprise a drive motor 36 for driving a reduction gear set 38 for rotating the star disc 14. For example, the reduction gear set 38 may comprise three reduction gears that connect to a final reduction gear 40 that rotates the star disc 14 in the star disc tray 32. Other configurations of gears may be used. The drive motor 36 can have several fixed speeds for rotation that may be selected. Alternatively, a variable speed motor for changing the rotation speed may be provided.

The focus lens mechanism 13 may comprise a lower condenser lens 18 and an upper condenser lens 19.

Figure 6:
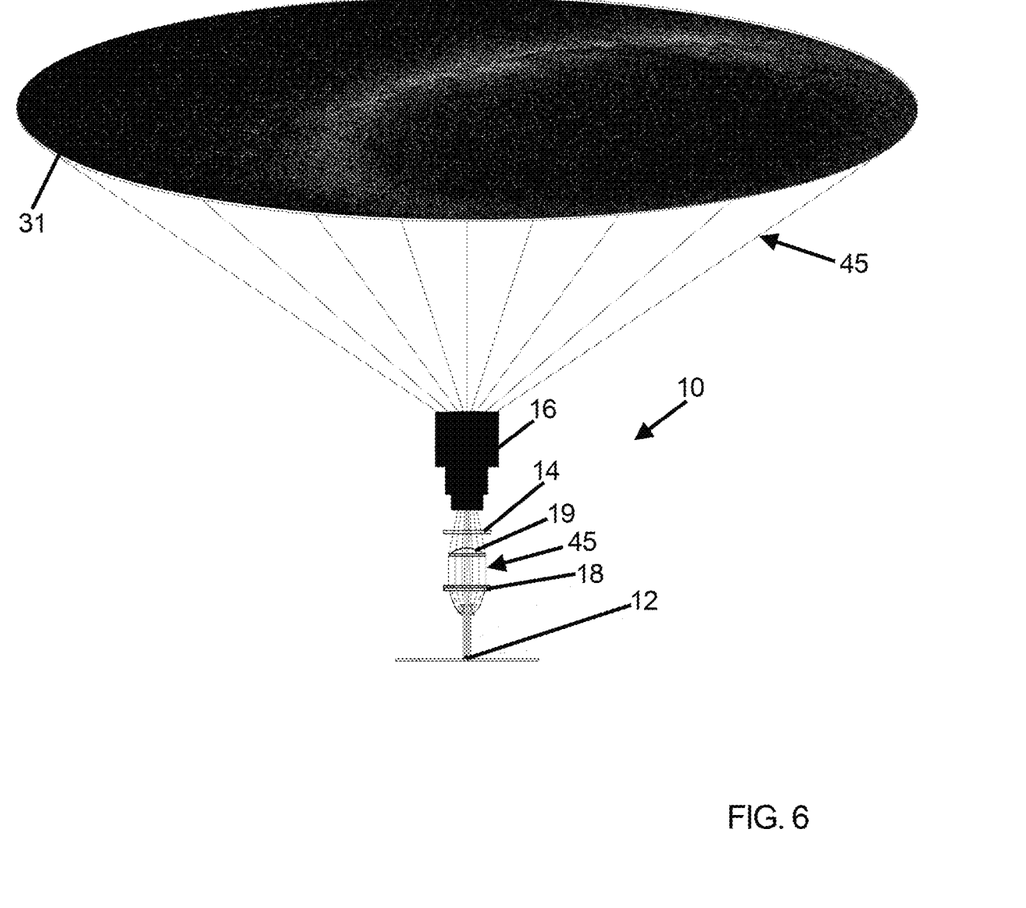
FIG. 6 shows an example embodiment of the flow of light through the planetarium projection system in accordance with the present invention.

FIG. 6 shows an example embodiment of the flow of light 45 through the projection system 10. The light 45 output from the light source 12 is fed through the lower condenser lens 18 and the upper condenser lens 19. Condenser lenses 18 and 19 shape the light 45 into a tighter beam of light which then passes through the star disc 14 and enters the zoom lens 16. As the star disc 14 allows light to only pass through the etched portions defining the star and planet pattern 15, the light 45 projected from the zoom lens 16 will be displayed on a display surface in the form of a projected image 31 having the star and planet pattern 15.

The zoom lens 16 may comprise a varifocal zoom lens. The zoom lens 16 may comprise a 2.8-12 mm CCTV lens. The zoom lens 16 may have a zoom ratio of approximately 4.3. Those skilled in the art will appreciate that zoom lenses having different focal lengths and magnifications may be used.

Various functions of the projection system may be controlled by a circuit board (not shown) and control panel 26 with various control buttons 28 as shown in FIG. 2. Control buttons 28 may be provided for turning the projector 20 on and off, controlling the drive motor 36 for rotation of the star disc 14, and a timer for controlling the run time of the projector 20. For example, the timer may control the circuit board for automatic shutoff of the projector 20 after a certain time period (e.g., after a 15, 30 or 60 minute run time).

A cooling fan with a heat sink (not shown) may be provided to cool the light source 12. The cooling fan speed may be variable and based on the output from a thermistor that monitors the temperature of the light source 12.

A USB charging port 30 (or any other type of charging port) may also be provided for charging a power source for the projector 20. The power source, for example a rechargeable battery, may be controlled by the circuit board and power the light source 12, the drive motor 36, the cooling fan, and other features and functions of the projector 20.

It should now be appreciated that the present invention provides advantageous personal planetarium systems and apparatus, as well as methods for proving a personal planetarium.

Although the invention has been described in connection with various illustrated embodiments, numerous modifications and adaptations may be made thereto without departing from the spirit and scope of the invention as set forth in the claims.

What is claimed is:

1. A personal planetarium projection system, comprising:
   a light source;
   a removable star disc comprising a transparent star and planet pattern;
   a focus lens mechanism for focusing the light source through the star disc; and
   a single manual optical zoom lens for projecting light passing through the star disc onto a projection surface to produce a projected image, the zoom lens enabling different magnifications of the projected image.

2. The personal planetarium projection system in accordance with claim 1, wherein the light source comprises a single LED light source.

3. The personal planetarium projection system in accordance with claim 1, wherein the zoom lens comprises:
   a movable focus ring for adjusting the focus of the projected image; and
   a movable zoom ring for adjusting the magnification of the projected image.

4. The personal planetarium projection system in accordance with claim 1, wherein the removable star disc comprises a glass disc with a chrome layer etched with the star and planet pattern.

5. The personal planetarium projection system in accordance with claim 1, wherein multiple removable star discs are provided, each of the multiple removable star discs comprises a different star and planet pattern.

6. The personal planetarium projection system in accordance with claim 1, wherein the focus lens mechanism comprises a lower condenser lens and an upper condenser lens.

7. The personal planetarium projection system in accordance with claim 1, further comprising a drive motor for driving a reduction gear set for rotating the star disc.

8. The personal planetarium projection system in accordance with claim 1, further comprising:
   a star disc tray for holding the star disc; and
   a star disc cover for securing the star disc in the star disc tray.

9. The personal planetarium projection system in accordance with claim 1, further comprising:
   a housing; and
   a two-part ball-shaped cover movably mounted for angular rotation in the housing, the two-part ball-shaped cover comprising an upper ball cover part and a lower ball cover part;
   wherein the zoom lens is mounted in the upper ball cover part.

10. The personal planetarium projection system in accordance with claim 1, wherein the zoom lens comprises a varifocal zoom lens.

11. The personal planetarium projection system in accordance with claim 10, wherein the zoom lens comprises a 2.8-12 mm CCTV lens.

12. The personal planetarium projection system in accordance with claim 1, wherein the zoom lens has zoom ratio of approximately 4.3.

13. A method for projecting a star and planet pattern onto a projection surface, comprising:
   focusing light from a light source through a star disc comprising a transparent star and planet pattern;
   providing a single manual optical zoom lens for projecting light passing through the star disc onto a projection surface to produce a projected image, the zoom lens enabling different magnifications of the projected image.

* * * * *